United States Patent [19]
Temple

[11] 3,849,148

[45] Nov. 19, 1974

[54] METHOD OF TREATING GLASS FIBERS TO IMPROVE ADHESION TO POLYOLEFINS

[75] Inventor: Chester S. Temple, Kennedy Twp., Pa.

[73] Assignee: PPG Industries, Inc., Pittsburgh, Pa.

[22] Filed: Apr. 14, 1972

[21] Appl. No.: 243,992

Related U.S. Application Data

[62] Division of Ser. No. 63,830, Aug. 14, 1970, abandoned.

[52] U.S. Cl. ............ 106/287 SB, 65/3, 117/126 GB, 117/126 GS, 117/126 GQ, 252/8.6, 252/8.9, 252/314
[51] Int. Cl. ..................... C03c 25/02, D06m 13/00
[58] Field of Search ............ 252/8.9, 312, 314, 8.6; 106/2, 287 SB; 8/115.6; 117/126 GB, 126 GS, 126 GQ, 54, 76 T; 65/3

[56] References Cited
UNITED STATES PATENTS

| | | |
|---|---|---|
| 3,013,915 | 12/1961 | Morgan ............................ 117/126 |
| 3,218,190 | 11/1965 | Patterson et al. ................... 117/76 |
| 3,284,179 | 11/1966 | Eilerman ........................... 117/126 |
| 3,472,729 | 10/1969 | Sterman et al. .................... 117/126 |
| 3,484,223 | 12/1969 | Vanderbilt et al. ................. 117/126 |

FOREIGN PATENTS OR APPLICATIONS

| | | |
|---|---|---|
| 1,435,016 | 3/1966 | France |

*Primary Examiner*—Herbert B. Guynn
*Attorney, Agent, or Firm*—John E. Curley; E. Kears Pollock; Russell A. Eberly

[57] ABSTRACT

An improved method of preparing glass fiber reinforced polyolefins which comprises contacting the glass fibers during forming with an aqueous size containing a coupling agent, a heat stable organic peroxide, a nonionic surfactant and a lubricant, then contacting the sized glass fibers with polyolefin material and heating until good bonding between the glass fibers and the polyolefin occurs.

3 Claims, 3 Drawing Figures

PATENTED NOV 19 1974  3,849,140
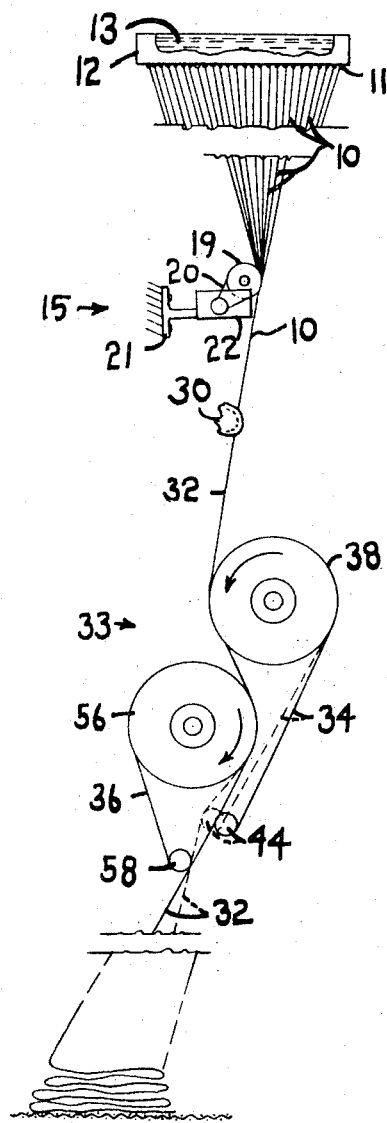
FIG. 1
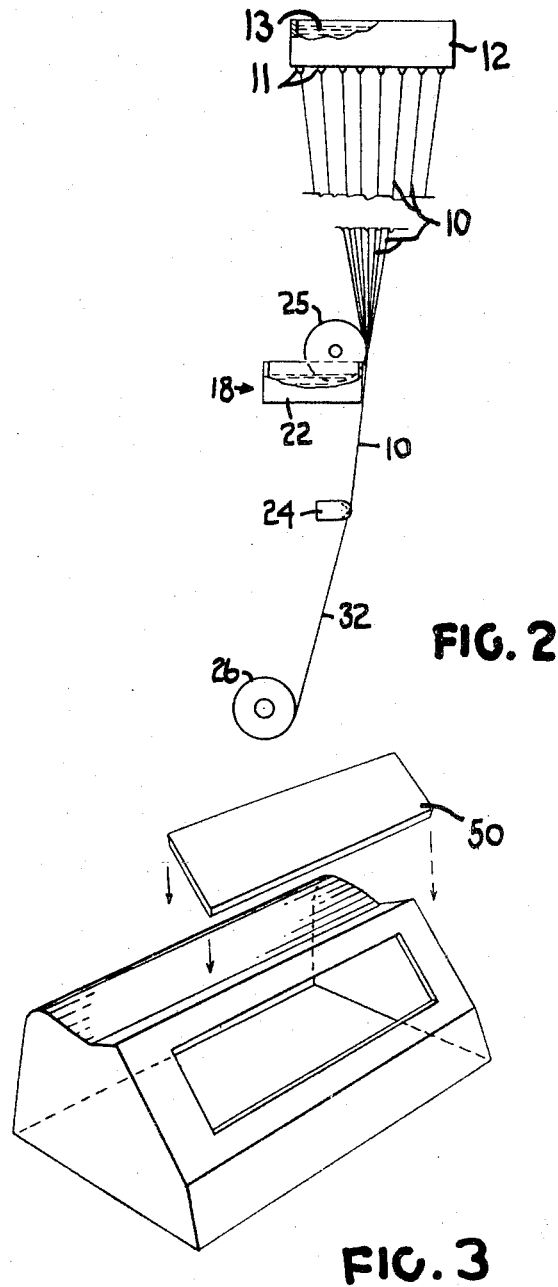
FIG. 2
FIG. 3

METHOD OF TREATING GLASS FIBERS TO IMPROVE ADHESION TO POLYOLEFINS

This is a division of application Ser. No. 63,830, filed Aug. 14, 1970, now abandoned.

BACKGROUND OF THE INVENTION

The present invention relates to glass fiber treatment and particularly relates to treating glass fibers during or after forming with an aqueous size which prepares the glass fibers for bonding to polyolefins in the reinforcement of polyolefin materials.

Polyolefins, because of their relative plasticity, must be reinforced if used to produce articles requiring structural strength during formation or use. Polyolefins reinforced with glass fibers exhibit good dimensional stability and have excellent tensile strength, flexural modulus, flexural strength, impact resistance and creep resistance suitable for a wide range of uses.

It is known that glass fibers in the form of continuous strands, chopped strands or mats can be used successfully to reinforce polyolefins. And it is known that without effective coupling between the glass and the polyolefin, the adhesion between the two will be weak and separation will occur under shear or tensile stresses. It is further known that the affinity of glass for water aggravates bond weakness when glass is inadequately bonded to polyolefins.

A workable method has been disclosed which permits bonding glass to "lower" polyolefins which are essentially crystalline plastics formed from monomers having not more than four carbon atoms. As disclosed in U.S. Pat. No. 3,013,915 at Column 2, lines 38–46, glass bonding to the "lower" polyolefins may be improved by "cleaning the glass surface, applying a coupling agent to it, treating with a chemical agent which is a source of dehydrogenating or oxidizing radicals, contacting the polyolefin with the glass, and fusing it by heating the polyolefin above its melting point to complete the interbonding." At Column 4, lines 16–19, the disclosure reveals a preference for radical sources having low decomposition points below 180°F. and at Column 4, lines 69–71, indicates that exposure to heat must be avoided.

This old method for bonding glass to polyolefins, while resulting in improved polyolefin-glass bond strengths, exhibits several associated objectionable features.

The glass treatment according to prior teachings requires several separate processing steps with consequent multiple handling.

The glass treatment according to prior teachings requires that the organic peroxide be applied from a volatile organic solvent solution and requires the vaporization of the solvent from the glass. Consequently, extreme precautions are required to recover the solvent in a manner which will minimize the associated fire and air pollution hazards attendant the use of such flammable and toxic materials. In the absence of adequate precautions, practice according to the prior art endangers the health and safety of persons in the vicinity of the process.

Glass treated in accordance with prior teachings cannot be stored for any substantial period prior to bonding with polyolefins, for apparent degradation of the coated glass occurs, and ultimate reinforced polyolefin strengths are less than for polyolefins reinforced by treated glass immediately following the glass treatment. This, of course, prevents the preparation of treated glass to be stored and marketed for later use by manufacturers of reinforced polyolefin products.

Polyolefin-reinforced articles produced by the methods earlier disclosed, particularly those produced using dicumyl peroxide, have an objectionable odor.

It has long been desired that a treatment of glass fibers during the process of their formation be provided which would yield treated glass fiber suitable for bonding to polyolefins immediately or after storage without intermediate cleaning and without creating health or safety hazards.

It is an object of the present invention to eliminate the presently common glass mat cleaning and treatment steps associated with polyolefin reinforcement.

It is an object of this invention to produce treated glass fiber suitable for polyolefin reinforcement which may be held in storage prior to use without degradation of bonding properties of the treated glass fiber.

It is an object of this invention to provide an improved glass fiber treatment for the improvement of the polyolefin bonding characteristics of the treated glass fiber which eliminates the hazardous volatile organic solvents used in conjunction with treating glass fibers according to the prior art.

It is an object of this invention to provide a method of treating glass fibers with a coupling agent and an agent for improved polyolefin bonding in a single step and in a manner which will not cause the deactivation of the agent for improved polyolefin bonding.

It is an object of this invention to provide a treated fiber glass reinforcing material suitable for the use of manufacturers of reinforced polyolefin articles which would permit the use of a single grade of polyolefin for producing reinforced and unreinforced articles alike.

It is an object of this invention to provide a fiber glass treatment using an aqueous forming size containing a free radical initiator which is not deactivated by the presence of other required materials in a glass forming size or by the necessary heat treatment of glass fiber coupling agents.

It is an object of this invention to provide a fiber glass treatment using an aqueous forming size which contains a free radical initiator uniformly dispersed.

It is an object of this invention to provide a treated glass fiber suitable for reinforcing polyolefins such that the reinforced polyolefins are suitable for molding, stamping, vacuum forming, or laminating with improved wet and dry strengths, improved surface quality and improved odor characteristics.

These and other objects which are accomplished by the practice of this invention will become apparent from the following description of the invention.

SUMMARY OF THE INVENTION

In general, the process of this invention comprises the steps of preparing an aqueous size containing a coupling agent, a heat stable organic peroxide, a non-ionic surfactant and usually a lubricant or softener, and optionally a film former; forming the glass into fiber strands and during the formation applying the aqueous size to the glass fiber strands; heating the size in contact with the glass driving off the water, and then using the treated glass fibers for bonding or reinforcing polyolefins.

Suitable aqueous sizes are those consisting essentially of about 0.1 to 6.0 percent by weight of a heat stable organic peroxide and about 0.1 to 6.0 percent by weight of a non-ionic surfactant. The size may also contain about 0.5 to 10 percent by weight of a coupling agent and 0.001 to 1.0 percent by weight of a fiber lubricant. By heat stable organic peroxides, it is intended that those peroxides having half-lives exceeding 60 hours at 212°F. and 20 minutes at 300°F. be encompassed. The aqueous sizes have viscosities which have been conventionally found to be suitable for glass fiber strand forming sizes to permit adequate pickup of size by the strand to obtain strand integrity and prevent destruction of the strand by abrasion of the individual fibers against each other.

Any glass suitable for reinforcing and for drawing in fiber form may suitably be treated in accordance with the present invention. Soda-lime glasses and borosilicate ("E") glasses are particularly suited for this practice.

The glass fiber strands to be treated according to this invention may be typically produced according to the teachings of U.S. Pat. No. 2,133,238. The glass fiber strands are composed of a multitude of fine glass filaments which are formed by being drawn at a high rate of speed from molten cones of glass located at the tips of small orifices in a bushing. During formation, the filaments are coated with the aqueous size prepared according to the description below. Coating of the filaments takes place while they are moving at a speed of the order of 1,000 to 20,000 feet per minute. The coating is accomplished in the immediate vicinity of the hot bushings and the glass furnace in which the glass is melted, and after coating, the glass fiber strands move a short distance onto collecting means. After the strands have been sized, they may be baked or heated to drive off residual moisture from the sized glass. Alternatively, the sized glass may be used in the next processing step.

The aqueous size used to contact and coat the glass fibers is comprised of a coupling agent, a heat stable free radical initiator which is a material capable of improving polyolefin bonding to glass fibers, a non-ionic surfactant and usually a lubricant. Coupling agents which are useful in the practice of this invention include:

vinyl-tris-(beta methoxyethoxy) silane
vinyl-triethoxy silane
gamma-methacryloxy propyl-trimethoxy silane
vinyl tri-acetoxy silane
or an acrylate salt of gamma amino propyl triethoxy silane.

Free radical initiators are presumed useful to improve bonding with polyolefins by dehydrogenating $CH_2$ groups in the polyolefin and the coupling agent to permit linking between the two. Free radical initiators having low decomposition points have, in the past, been thought necessary for effective dehydrogenation of polyolefins, but it has been found that certain heat stable free radical initiators perform in a superior fashion. Of particular utility have been organic peroxides having peak decomposition temperatures above about 200°F.; alpha, alpha' bis(t-butyl peroxy)-diisopropyl benzene has proven especially suited as a free radical initiator or dehydrogenating agent.

Other free radical initiators which may be used include heat stable peroxides such as tris(t-butyl peroxy)- diisopropyl benzene, 2,5(t-butyl peroxy) hexane and 2,5(t-butyl peroxy) hexyne. Free radical initiators, other than peroxides, which are useful are heat stable peresters.

Past experience indicated that deactivation of the free radical initiators occurred prior to the contacting and heating of glass fibers with polyolefins. Apparent deactivation occurred whether the free radical initiator was used to treat glass fibers having been treated with a coupling agent or the free radical initiator was used to treat polyolefin. But with the discovery that emulsions of the preferred free radical initiators and non-ionic surfactants such as polyethoxy phenols could be prepared and dispersed in water containing a coupling agent, the problems of deactivation and inadequate solubility of the useful free radical initiators were overcome. Emulsions prepared at temperatures in the range of 120°F. to 210°F. and which include isooctyl phenyl polyethoxy ethanol have been particularly useful.

Other useful non-ionic surfactants belonging to the class of polyethoxy phenols are nonyl polyethoxy ethanol and alkyl ether polyethoxy ethanol. Other non-ionic surfactants which are useful in the practice of this invention are polyalkylene glycol ethers, alkyl polyether alcohol and alkylaryl polyether alcohol.

Lubricants which may be used in the practice of this invention include commercially available textile lubricants such as Emerylube, sold by Emery Industries, and No. 185A, sold by Arnold Hoffman Company. These lubricants are cationic-active, acid-solubilized, fatty acid amides. Other commercially available textile lubricants which can successfully be used in the size include acid-solubilized, fatty acid amides such as stearic amide; saturated and unsaturated fatty acid amides wherein the acid group contains 4 to 24 carbon atoms; anhydrous, acid-solubilized polymers of the lower molecular weight unsaturated fatty acid amides; alkyl imidazoline derivatives such as u-alkyl-N-amido-alkyl imidazolines which may be formed by reacting fatty acids with polyalkylene polyamines under conditions which produce ring closure as fully described in U.S. Pat. Nos. 2,200,815, 2,267,965, 2,268,273 and 2,355,837.

In addition to the constituents already included in the aqueous glass forming size, protective colloids may be present without departing from the spirit of the invention. Protective colloids such as polyvinyl alcohol and polyvinyl pyrrolidone may be added to improve emulsion characteristics.

Polyolefins which may be successfully reinforced with glass fibers treated according to this invention include low and high density polyethylenes and polypropylenes, isotactic polybutylenes, and copolymers of polyethylene and polypropylene. Heat-resistant nucleated polypropylene is successfully reinforced according to this invention; a typical nucleated polypropylene is that sold by Shell Chemical Company as Propylene Grade No. 5524. Polyvinyl chloride modified by polypropylene, such as that marketed by Airco Company as 400 Series Resins, may also be reinforced using glass fibers treated according to this invention.

BRIEF DESCRIPTION OF THE DRAWINGS

FIG. 1 is a schematic of the preferred apparatus for forming fibers, applying the aqueous size and producing a continuous strand mat for reinforcing polyolefins.

FIG. 2 is a schematic of a second embodiment also suitable for the practice of this invention where continuous strand mat formation is not intended.

FIG. 3 is an isometric presentation of a test stamping used to test the characteristics of materials prepared according to this invention.

DESCRIPTION OF THE PREFERRED EMBODIMENTS

Treatment of glass fibers for polyolefin reinforcement using typical useful aqueous sizes may be illustrated by the following examples.

Example I

| Ingredient | | Parts by Weight |
|---|---|---|
| Functional Identification | Chemical Identification | |
| Coupling Agent | Vinyl tris(beta methoxy ethoxy) silane | 4.0 |
| pH Control | Acetic acid | .1 |
| Free Radical Initiator | alpha, alpha'bis(t-butyl peroxy) isopropyl benzene | 1.5 |
| Non-Ionic Surfactant | Isooctylphenyl polyethoxy ethanol | .85 |
| Lubricant | Emerylube (Sold by Emery Industries) | .005 |
| Water | | 93.5 |

The glass fiber size is prepared by dissolving the coupling agent and lubricant in about 75 percent of the water after adjusting the pH to about 4 by acetic acid addition. The free radical initiator is thoroughly mixed with the non-ionic surfactant maintaining the temperature of the mixture above the melting point of the free radical initiator. Suitable temperature control is possible by immersing the mixing vessel in boiling water. After thoroughly mixing the free radical initiator with the non-ionic surfactant, water is slowly added to the mixture at a temperature above the melting point of the free radical initiator, preferably in the range of about 140°F. to 150°F., until the emulsion inverts. The emulsion is slowly cooled to ambient conditions by continued water addition. The emulsion is then slowly added to the aqueous mixture containing the coupling agent and the remaining water is added to the mixture.

The aqueous sizing mixture is applied to the individual fibers during their formation according to the manner illustrated in the drawings. In the preferred embodiment shown by FIG. 1, the aqueous sizing mixture is applied to the individual fiber filaments 10 upon their emergence as streams from orifices 11 in an electrically heated bushing 12 containing molten glass 13. The streams are attenuated into filaments 10 by means of a strand-pulling device 33. The filaments 10 are directed so as to engage a belt 20 of a sizing applicator device of conventional construction, generally identified as 15. The belt 20 is endless and is driven by a pulley 19 which in turn is driven by a suitable prime mover (not shown). The applicator 15 is supported by suitable support means 21 so that it is rigidly positioned at its desired location. The aqueous sizing mixture is controllably delivered to the belt 20, and by contact therewith, to the filaments 10. Other types of sizing applicators can be used without departing from the spirit of the invention.

The sizing-coated filaments 10 are then directed over a gathering shoe 30 and gathered thereby into a substantially untwisted multifilament strand 32. The strand 32 is directed between engaging portions of belts 34 and 36 of the strand-pulling device 33 and are discharged for collection by any well-known means or on a foraminous conveyor.

The strand-pulling device and the method of its use are fully disclosed in U.S. Pat. No. 3,292,013, which is incorporated by reference. A continuous strand mat in swirl form is produced by the described process.

The mat is then heated to a temperature in the range of about 180°F. to 220°F. for a time sufficient for complete water removal. The continuous strand mat is then needled in a conventional needle loom (not shown) with barbed needles. Thereafter, the mat is either wound into a roll for subsequent use, cut to desired length for further processing, or continuously processed. Mats are then combined and impregnated with polyolefin resin or laminated with polyolefin sheets to form reinforced polyolefin articles which are heated at a temperature in the range of about 400°F. to 430°F. at a pressure of about 90 – 150 pounds/square inch for about 5 minutes to 20 minutes to successfully bond the reinforcing glass fibers to the polyolefin. The mats and resin may be successfully combined according to the methods disclosed in copending applications Ser. No. 22,534 and Ser. No. 22,535, filed Mar. 25, 1970.

Laminates are produced and stamped for testing. The stamping test procedure which is used comprises the following.

A standardized stamping shape illustrated in FIG. 3 is used to test the performance of all reinforcing materials and methods. The stamping is a "tub" having its length to width to maximum depth dimensions in a ratio of about 7:4:2.25. The test "tubs" having a length of about 7 inches at the point of maximum width and 6½ inches at the apex of the cross section. A cross section or end view of a "tub" reveals the variety of shapes represented in the test stamping. The stamping must conform to a curved or cylindrical shape, interior and exterior corners of about 90° and an exterior corner of about 120°. At the apex of the cross section at the end of the "tub," the reinforced polyolefin laminate must conform to a three-dimensional corner having angles approximating 90° but slightly greater.

The "tubs" are stamped by heating the glass fib reinforced laminates to about 375°F. then stamping with conventional stamping equipment fitted with dies for the test shape. Stamping is accomplished by both regular flow and stacked flow techniques which are known per se. Heat times for pieces stamped by regular flow technique are 16 to 24 seconds. For the stack flow technique, 24 seconds is typically used. Stampings are about 100 mils thick throughout.

After stamping, the "tubs" are checked for appearance and a test segment 50 is cut from each "tub" as shown in FIG. 3. The test segment measuring about 1 inch by 6 inches and about 100 mils in thickness is used for standard materials testing. Replicate tests are made at two locations along the longer dimension of the test segment. Flexural strength as yield strength and flexural modulus are determined according to ASTM test procedure D–790–66. Tensile strengths are determined according to ASTM test procedure D–638–68. Uniformity of flow of glass fiber and polyolefin during stamping is evaluated by determining glass content of the test segment by loss on ignition determination accomplished by heating in a conventional muffle furnace at sufficient temperature and for sufficient time to burn off the polyolefin accompanied by pre- and post-burning weighing. All tests are performed on unstamped laminates corresponding to those used for stamping as well as on the test segments from the stampings. Determination of changes in physical characteristics caused by stamping is thus accomplished.

The samples produced according to the method of this example have the following properties. Samples stamped by regular flow techniques typically have 40 percent by weight glass, flexural strengths of 27,000 pounds per square inch, and flexural modulus of $1.00 \times 10^6$ pounds per square inch. The lamininates from which these stampings are prepared have about 40 percent by weight glass, flexural strengths of 27,000 pounds per square inch, and flexural modulus of $1.00 \times 10^6$ pounds per square inch. The surfaces of the stamped articles are smooth with no appearance of glass strands popping from the surface.

EXAMPLE II

| Ingredient | | |
|---|---|---|
| Functional Identification | Chemical Identification | Parts by Weight |
| Coupling Agent | Vinyl tris(beta methoxyethoxy silane | 2.0 |
| pH Control | Acetic acid | .1 |
| Free Radical Initiator | alpha, alpha'bis(t-butyl peroxy) isopropyl benzene | 0.975 |
| Non-Ionic Surfactant | Isooctyl phenyl polyethoxy ethanol | .6 |
| Lubricant | Emerylube (Sold by Emery Industries) | .005 |
| Film Former | Vinyl acetate copolymer (50% solids in water) | 10.0 |
| Water | | 86.3 |

The size is prepared as in Example I with the film former added to the mixture containing the coupling agent. The presence of film former improves strand integrity in this second method of size application and in the chopping of the strands produced. This method is used to prepare a chopped strand mat. The aqueous size is applied utilizing the apparatus of FIG. 2. The aqueous size is applied to the individual fiber filaments 10 just after their emergence from orifices 11 in an electrically heated bushing 12 containing molten glass 13. The aqueous size is applied to the filaments, prior to their grouping to form a strand, by means of a roller applicator 18 which is composed of a rotating roller 25 partially submerged in the aqueous size contained in a reservoir 22. Such an applicator is shown in detail in U.S. Pat. No. 2,728,972. The fibers are grouped into a strand by a graphite guide 24 and wound around a forming tube 26 rotating at approximately 7,500 r.p.m. to produce a strand travel of approximately 12,000 to 15,000 feet per minute. The glass fiber strands are then dried. This is accomplished by baking the package of fiber at a temperature and for a length of time sufficient to remove substantially all of the water, for example, at about 220°F. for 8 hours. The dried strand is chopped to 1 – 5 inch lengths and a mat prepared by needling according to the method of copending application Ser. No. 810,261.

The chopped strand mat is then laminated with polyolefin and stamped as in Example I for testing. The test procedures of Example I are performed with the following results. After stamping, the samples have a glass content of 40 percent by weight, flexural strength of 27,000 pounds per square inch, and flexural modulus of $1.00 \times 10^6$ pounds per square inch. The laminate from which the parts are stamped has a glass content of 40 percent by weight, flexural strength of 27,000 pounds per square inch, and flexural modulus of $1.00 \times 10^6$ pounds per square inch.

EXAMPLE III

Other useful aqueous size compositions are prepared which can include film formers such as a vinyl acetate copolymer or homopolymers, for instance RESYN 2828 or 1031 of National Starch and Chemical Company. Present as about 0.5 to 5 percent by weight of the size, the film former is useful to bind the filaments together in the strand during processing. The characteristics of the final reinforced articles prepared using an aqueous size containing a film former are as good as those prepared by the size of Example I.

EXAMPLE IV

Glass fibers are sized using the methods of Examples I or II using an aqueous size to which maleic acid has been added. The maleic acid is present up to about 0.5 percent by weight. The resulting articles of polyolefin reinforced by glass fibers treated with this size exhibit improved surface characteristics.

EXAMPLES V – IX

Further examples are summarized in Table I. The test results for stampings made according to these examples, along with those for Examples I and II and for stampings made using a commercially available glass fiber reinforced polyolefin, are compared in Table II. The method of these examples, except for changes in the aqueous size, is that of the preferred embodiment, Example I. In Example I – Ix, the polyolefin used for lamination is a heat-resistant nucleated polypropylene such as Shell Chemical No. 5524.

TABLE I

| EXAMPLE | V | VI | VII | VIII | IX |
|---|---|---|---|---|---|
| Material (Parts by Weight) | | | | | |
| Coupling Agent<br>(1) vinyl-tris(beta methoxyethoxy) silane<br>(2) gamma acryloxy propyl trimethoxy silane | 4.0 (1) | 4.0 (2) | 6.0 (1) | 6.0 (1) | 4.0 (1) |
| Free Radical Initiator<br>(1) alpha,alpha'bis(t-butyl peroxy)diisobutyl benzene<br>(2) dicumyl peroxide | 0.4 (1) | 1.5 (1) | 3.0 (1) | 3.0 (1) | 1.6 (2) |

TABLE I—Continued

| EXAMPLE | V | VI | VII | VIII | IX |
|---|---|---|---|---|---|
| Lubricant<br>  Emerylube - Emery Industries | .005 | .005 | .005 | .005 | .005 |
| pH Control<br>  Acetic acid | 0.1 | 0.1 | 0.1 | 0.1 | 0.1 |
| Film Former<br>  Vinyl acetate copolymer<br>  50% solids in water | 2.1 | 0 | 0 | 1.5 | 1.0 |
| Water | 93.2 | 93.5 | 89.2 | 87.7 | 92.3 |
| Non-Ionic Surfactant<br>  Isooctyl phenyl polyethoxy ethanol | 0.2 | 0.9 | 1.7 | 1.7 | 0.9 |

TABLE II

| TEST SAMPLE | TYPE STAMPING | FLEXURAL STRENGTH (pounds/square inch) Before Stamping | After Stamping | MODULUS (pounds/square inch) Before Stamping | After Stamping | PER CENT WEIGHT GLASS Before Stamping | After Stamping |
|---|---|---|---|---|---|---|---|
| Example I | Regular | 26–28,000 | 26–28,000 | $1.00 \times 10^6$ | $1.00 \times 10^6$ | 39–41 | 39–41 |
|  | Stack | 26–28,000 | 26–28,000 | $1.00 \times 10^6$ | $1.00 \times 10^6$ | 39–41 | 39–41 |
| Example II | Regular | 26–28,000 | 26–28,000 | $1.00 \times 10^6$ | $1.00 \times 10^6$ | 39–41 | 39–41 |
|  | Stack | 26–28,000 | 26–28,000 | $1.00 \times 10^6$ | $1.00 \times 10^6$ | 39–41 | 39–41 |
| Example V | Regular | 25–27,000 | 21–23,000 | $.90–1.00 \times 10^6$ | $.8–.9 \times 10^6$ | 39–41 | 39–41 |
|  | Stack | 25–27,000 | 21–23,000 | $.90–1.00 \times 10^6$ | $.8–.9 \times 10^6$ | 39–41 | 39–41 |
| Example VI | Regular | 23–24,000 | 24–25,000 | $.95 \times 10^6$ | $.95 \times 10^6$ | 40–41 | 40–41 |
|  | Stack | 23–24,000 | 24–25,000 | $.95 \times 10^6$ | $.95 \times 10^6$ | 40–41 | 40–41 |
| Example VII | Regular | 26–28,000 | 26–28,000 | $1.00 \times 10^6$ | $1.00 \times 10^6$ | 39–41 | 39–41 |
|  | Stack | 26–28,000 | 26–28,000 | $1.00 \times 10^6$ | $1.00 \times 10^6$ | 39–41 | 39–41 |
| Example VIII | Regular | 26–28,000 | 26–28,000 | $1.00 \times 10^6$ | $1.00 \times 10^6$ | 39–41 | 39–41 |
|  | Stack | 26–28,000 | 26–28,000 | $1.00 \times 10^6$ | $1.00 \times 10^6$ | 39–41 | 39–41 |
| "Stampglass"* | Regular | 20,000 | 13,300 | $.75 \times 10^6$ | $.80 \times 10^6$ | 45–50 | 47 |
|  | Stack | 20,000 | 20,300** | $.75 \times 10^6$ | $1.21 \times 10^{6**}$ | 45–50 | 50 |
| Example IX | Regular | 24–25,000 | 21–24,000 | $0.80–0.90 \times 10^6$ | $0.80–0.90 \times 10^6$ | 39–41 | 39–41 |
|  | Stack | 24–25,000 | 21–24,000 | $0.80–0.90 \times 10^6$ | $0.80–0.90 \times 10^6$ | 39–41 | 39–41 |

\* Sold by Owens-Corning Fiberglas Corp.
\*\* Increase in physicals due to orientation of fibers perpendicular to plane of test.

Although the present invention has been described with respect to specific details of certain embodiments thereof, it is not intended that such details act as limitations upon the scope of the invention, the invention instead being limited only as claimed.

I claim:

1. An aqueous size suitable for application on glass fibers consisting of an aqueous emulsion consisting of 0.5 to 10 percent by weight of an organic-silane coupling agent, 0.1 to 6.0 percent by weight of a nonionic surfactant, 0.001 to 1 percent by weight of a glass fiber lubricant and 0.1 to 6 percent by weight of an organic peroxide, free radical initiator having a half life exceeding 60 hours at 212°F. and 20 minutes at 300°F.

2. An aqueous size suitable for application on fiber glass consisting of an aqueous emulsion consisting of 0.5 to 10 percent by weight of an organic-silane coupling agent, 0.1 to 6.0 percent by weight of a nonionic surfactant, 0.001 to 1.0 percent by weight of a glass fiber lubricant, 0.1 to 6 percent by weight of an organic peroxide, free radical initiator having a half life exceeding 60 hours at 212°F. and 20 minutes at 300°F., acetic acid in an amount sufficient to adjust the pH of said emulsion to about 4 and maleic acid in an amount sufficient to improve the surface quality of polyolefin reinforced by said aqueous size.

3. A method of preparing an aqueous emulsion of a size suitable for application on glass fibers consisting of mixing a heat stable, organic peroxide, free radical initiator having a half life exceeding 60 hours at 212°F. and 20 minutes at 300°F., with a nonionic surfactant at a temperature above the melting point of the said peroxide to form a mixture thereof, adding water to the mixture so formed at a temperature of about 120°F. to about 210°F. to maintain the temperature of the mixture above the melting point of the said peroxide, said mixing continuing until an emulsion is formed, mixing water, an organic-silane coupling agent and a glass fiber lubricant to form a second mixture, combining the emulsion formed and the said second mixture to form a final aqueous size emulsion, controlling the quantity of said peroxide, nonionic surfactant and an organic-silane coupling agent during the mixing operation to maintain in the final aqueous emulsion between 0.5 to 10 percent by weight of the organic-silane coupling agent, 0.1 to 6.0 percent by weight of the nonionic surfactant, 0.001 to 1 percent by weight of the glass fiber lubricant and 0.1 to 6 percent by weight of the said peroxide.

* * * * *